Dec. 23, 1941.   W. P. LEAR ET AL   2,267,114
ELECTROMAGNETIC CLUTCH
Filed July 20, 1940

INVENTORS.
WILLIAM P. LEAR
ARLING W. RYBERG
BY Richard A. Marsen
ATTORNEY.

Patented Dec. 23, 1941

2,267,114

UNITED STATES PATENT OFFICE 2,267,114

ELECTROMAGNETIC CLUTCH

William P. Lear, Dayton, and Arling W. Ryberg, Murlin Heights, Ohio, assignors, by mesne assignments, to Lear Avia, Inc., Piqua, Ohio, a corporation of Illinois Application July 20, 1940, Serial No. 346,542

18 Claims. (Cl. 192—18)

This invention relates to motor drive systems, and more particularly relates to electric motor control systems embodying an improved electromagnetic clutch arrangement.

It is among the objects of the present invention to provide a motor drive system of general application, wherein the driven member is abruptly stopped or started in response to an electrical current or control signal. Towards this end, a novel electromagnetic clutch is incorporated with the motor. The clutch comprises a driven member which is firmly gripped by a drive member through magnetic forces arranged to interlink them a number of times. The design of the improved clutch permits the mass and moment of inertia of the driven member to be a minimum. The driven member, of very low inertia, is in practice generally directly coupled to reduction gearing, and affords prompt effective stopping upon clutch deenergization.

In the preferred embodiment, a brake shoe is arranged adjacent the driven clutch member in a manner to automatically engage it upon clutch disengagement. Axially compressed spring washers are used to effect the automatic braking. The mechanical combination of the low inertia multi-magnetically coupled driven clutch plate with the axial spring, the braking shoe, and the reduction gearing, effects uncoupling of the driven member substantially instantaneously with clutch deenergization, such as in response to an electrical control signal. Overshooting of the driven member is effectively inhibited.

An important aspect of the present invention is the arrangement of the drive and driven clutch members as coacting plates of magnetic material incorporating non-magnetic regions therein to constrain the magnetic forces in a manner to traverse the respective members a plurality of times. A greatly increased magnetic attractive action is thereby effected between the coacting clutch plates, resulting in marked clutch efficiency. Preferred material for the clutch plates is soft iron of good non-permanent magnetic characteristics. The non-magnetic regions in the clutch plates may be in the form of rings of copper or brass, or annular grooves, as will be shown and described in detail hereinafter.

A further feature of the invention is the concentric arrangement between the clutch winding and the magnetic drive member. The winding is mounted in a magnetic core attached to the stationary clutch housing. The winding core is spaced from and surrounds the magnetic hub of the driven member to form a small tubular air gap. Radial displacements of the driven member which occur in practical operation, do not decrease the effectiveness of the magnetic clutch action. Also, assembly and servicing of the clutch and motor are simplified due to the practical air gap tolerances inherent in the novel clutch design.

The electromagnetic winding of the clutch may preferably be connected in direct series circuital relation with the electric motor of the drive system. In this manner, the clutch is instantaneously energized or deenergized in correspondence with the required operation of the motor. Also, the clutching force increases in correspondence with driven load due to a corresponding current flow increase through both the motor and clutch winding.

The novel drive system of the invention is generally applicable to many types of remote control systems, particularly to those requiring close correspondence between the initiation of a control signal impulse and a resultant movement in the apparatus controlled. Advantageous applications thereof are indicated in such diverse systems as automatic radio direction finders; air pressure and/or temperature controllers for aircraft cabins; and motor drive system for remotely controlling the reeling of a trailing wire radio antenna on an aircraft. The present case relates to the subject matter of the copending application Serial No. 323,106 filed on March 9, 1940 entitled "Motor positioning system," which is assigned to the same assignee as is the present application.

The motor-clutch drive of the radio direction finder disclosed in the copending application "Automatic radio direction indicator," Serial No. 286,733, filed on July 27, 1939 and assigned to the same assignee as this case, may advantageously be replaced by the improved abruptly stopping drive control arrangement of the present invention. Any tendency of hunting or overshooting by the motor driven loop and indicators of the automatic direction finder is even further minimized with the drive apparatus to be described in detail hereinafter. The motor drive of the copending application, Serial No. 296,725, filed on September 27, 1939 for "Antenna reeling system," also assigned to the same assignee, may well comprise the invention drive system. Numerous other applications of the motor-clutch arrangement will present themselves to those skilled in the art.

The above and other advantages, features and capabilities of the invention will appear from the subjoined detailed description of specific embodiments thereof, illustrated in the accompanying drawing in which.

Figures 1, 2, 3, 4:
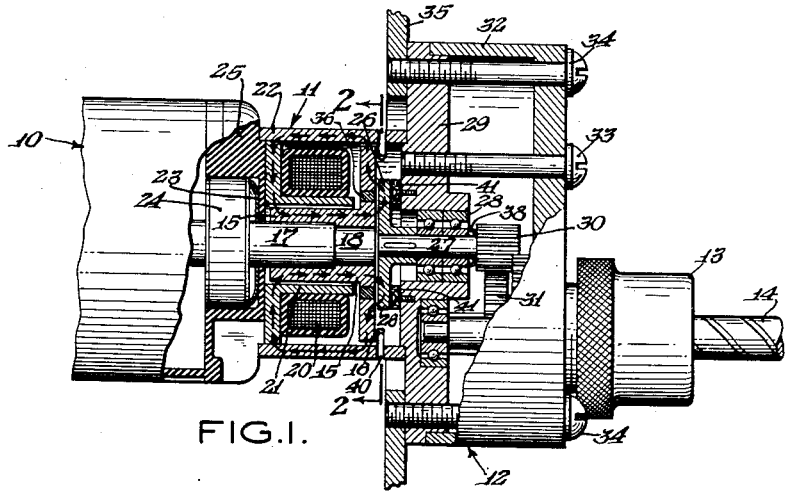
Fig. 1 is a cross-sectional view, partly in elevation, of one embodiment of the motor-clutch drive of the invention.
Fig. 2 is an enlarged vertical cross-sectional view through the clutch of Fig. 1, taken along the line 2—2 thereof.
Fig. 3 is a vertical cross-sectional view through a modified form of magnetic clutch.
Fig. 4 is a schematic electrical diagram of a preferred motor and clutch arrangement of the invention.

A practical embodiment of the present invention is illustrated in vertical cross-section and partial elevation in Fig. 1. Reversible electric motor 10 is coupled to electromagnetic clutch 11, the output of which is joined to reduction gearing unit 12. Mechanical cable 14 is connected to gearing 12 through coupling member 13. Hub 15 of clutch drive disc 16 is attached to motor shaft 17, the end 18 of which is of reduced section to insure secure placement of hub 15 thereon.

Magnetic clutch coil 20 is mounted on a coil core 21 of magnetic material. Core 21 is fixedly mounted with housing 22 of the clutch. A spring 23 is arranged between motor bearing 24 and motor end portion 25 for mechanically biasing drive disk 16 to the left. A small end play is incorporated for the rotor of motor 10, (not shown), and its associated shaft 17. Spring 23 holds drive disk 16 in proper position for normal operation and coaction with a driven disk 26; and serves to draw drive disk 16 away from driven disk 26 upon clutch deenergization.

Driven disk 26 is arranged as a face plate opposite the flat end surface of drive disk 16. Driven disk 26 is mounted on a rod 27 rotatably supported in twin roller bearings 28 mounted in end wall 25 of reduction gearing unit 12. Rod 27 of driven disk 26 is coupled to mechanical cable 14 through the reduction gearing including pinion gear 30 engaged with spur gear 31 and the other coacting gears of unit 12. Gear unit cover 32 is secured to end plate 29 by screw means 33 and, the whole assembly is in turn mounted on a panel 35 by a plurality of screws 34.

A brass, copper, or otherwise non-magnetic ring 36 is arranged in drive disk 16. Non-magnetic ring 36 is incorporated in the drive disk, near its hub 15. The material of hub 15 and outer portion 16 of the drive disk is of a magnetic nature, such as soft iron, to support magnetic lines on force therethrough. Hub 15 is concentric within coil core 21 and is spaced as practically close thereto as commercial tolerances permit. A tubular air gap 39 results. In a motor of this type, having a transverse diameter of one-and-one-half inches, the clearance or air gap between disk hub 15 and coil core 21 was .003 inch.

Thus, a radial displacement of the motor shaft 17 carrying hub 15 of the drive disk brings one section of hub 15 closer to coil core 21, reducing the normal air gap thereat. The gap between hub 15 and core 21 increases at the region diametrically opposite the reduced gap section. It has been found that the resultant magnetic clutching action remains intact; the normally symmetrical magnetic forces merely becoming eccentrically aligned, with the denser field at the smaller gap. Critical adjustment is thereupon unnecessary in assembling the clutch for service, the permissible mechanical tolerances being of the order of the air gap dimension. The total magnetic reluctance of the path remains substantially constant despite radial displacements of the drive shaft and hub 15 with respect to the stationary magnetic coil 20 and core 21.

Spring washers 38 are arranged to continuously mechanically bias driven disk 26 in a direction away from drive disk 16. In the preferred embodiment, washers 38 are under spring compression, and placed about rod 27 between roller bearings 28 and pinion 30. Different axial spring biasing means may be used. Driven disk 26 is thus normally held apart from drive disk 16 by a relatively narrow air gap. Spring 23 also normally biases drive disk 16 away from disk 26. No clutching action occurs as long as there is no contact between the disks 16 and 26. The small air gap between them, determined by practical clutch design considerations, permits their rapid engagement upon energization of the clutch.

An important feature of the present invention is the arrangement of the magnetic path between the drive disk and the driven disk in a manner to traverse the air gap between these disks a plurality of times. The clutching efficiency is greatly increased by such novel multiple magnetic transversal. The path of the magnetic lines of force through the clutch is schematically indicated by the arrows in Fig. 1. The magnetic force is generated by torroidal stationary coil 20 along the following path: Through drive disk hub 15, into driven disk 26, around brass ring 36 of the drive disk into the outer annular section constituting drive disk 16, across the air gap 39 between disk 16 and tubular casing 22, through the side wall of coil core 21, and across the air gap back to hub 15.

The magnetic path, shown in cross-section, is symmetrical with respect to the axis of rotation of drive disk 16, and extends torroidally thereabout. The magnetic effect is normally symmetrical. However usual axial or radial displacements of the moving parts distort the symmetry thereof, but the resultant action is substantially unaffected. When the clutch is energized, driven disk 26 is immediately attracted to and frictionally gripped with drive disk 16. The magnetic steel or soft iron material used for disks 16 and 26 effects a firm frictional engagement. The clutching force depends upon the magnetic strength, which is in turn dependent upon the current flowing through winding 20. In view of the normally small air gap between driven disk 26 and drive disk 16, the clutching action is effective substantially instantaneously with the flow of current therethrough. The declutching action is also rapidly effected due to the immediate magnetic disengagement of the respective clutch disks, to their biasing apart by springs 23 and 38, and for other reasons to be described.

Slots or holes 40 are arranged in casing 22 of the clutch opposite the engagement position between disks 16 and 26 as shown in Figs. 1 and 2. Particles such as dust or grindings resulting from the frictional engagement and coaction of the clutch members pass out of the clutch through slots 40 due to centrifugal action imparted to them by the rotation of the clutch. The particles are impelled out of the clutch through the slots 40, and maintain the coacting clutch members in clean operative condition. Slots 40 are located in magnetic casing 22 adjacent to and just out-side the portion carrying the magnetic flux of the system. No added reluctance is introduced in the clutch magnetic path by slots 40 despite their closeness to it.

A brake shoe is incorporated in the clutch to coact with the driven disk 26 upon its disengagement from drive disk 16. Annular brake shoe 41 is secured to end plate 29 of the gear unit, by screws or other suitable means, and in proper relation with respect to driven disk 26 so that the spring action of spring washers 38 causes it to engage brake shoe 41 immediately upon disengagement. Two practical advantages are derived with fixed brake shoe 41. Firstly, the low mass driven disk 26 is brought to a stop practically instantaneously with clutch deenergization by the direct braking automatically brought into action, in conjunction also with the directly connected reduction gearing unit 12. Secondly, a predetermined close positioning of driven disk 26 with respect to drive disk 16 during the disengaged position is assured by the presence of the fixedly mounted brake shoe against which disk 26 becomes juxtaposed so that rapid reengagement thereof is effected upon clutch energization.

The design, construction and assembly of the novel clutch of the invention is extremely simple and practical. The drive member 16 is preferably constructed by first pressing brass ring 36 about a soft iron rod which corresponds to hub 15. Annular disk 16 is then fitted and pressed onto the brass ring 36. After parts 15, 36 and 16 are thus fitted, they are brazed together. After the brazing operation, the unit is machined to the required dimensions, and hub 15 is suitably bored to receive motor shaft 17, 18. Driven disk 26 is machined from soft iron.

Coil core 21 is secured to iron casing 22, and torroidal winding 20 is secured in place therein. Drive clutch member 15, 16 is fitted onto motor shaft 17, 18, inserted in coil core 21, and centered within the practical tolerance indicated. The driven disk 26 is mounted as part of reduction gearing unit 12. The drive assembly is arranged by mounting clutch section 11 between motor end 25 and reduction gearing unit 12. Driven disk 26 assumes a proper cooperative relation with drive disk 16 when the system is assembled.

A modification of the invention, particularly as to the magnetic path thereof, is schematically indicated in cross-sectional Fig. 3, wherein like components have the same numerals as those of Fig. 1. The drive disk of the clutch of Fig. 3 comprises two non-magnetic regions or rings 36 and 42 spaced about central magnetic section 16', and 43. The driven disk comprises an inner magnetic disk 26', a non-magnetic ring 44 concentric thereabout, and an outer ring 45 of magnetic material.

The mechanical arrangement of the clutch as well as of the drive and driven disk members is otherwise the same as in the clutch of Fig. 1. In the modified arrangement, however, the magnetic path traverses the gap between the clutch disks four times instead of twice. The clutching efficiency for a given electrical power input to the clutch is enhanced. The small increase in reluctance of the total magnetic path as compared with that of Fig. 1 is more than compensated for by the greater effective magnetic coaction of the respective clutch disks.

Fig. 4 is a schematic electrical diagram of a preferred circuit connection of the electromagnetic clutch with a reversible direct current control motor. Armature 50 of the motor is connected in series with clutch coil 20 through leads 51, 52. A field winding 53 of the motor is connected to armature 50 at its center. The respective halves of field winding 53 are selectively connectible to a direct current source 54 through the relay system comprising lever 55 and solenoids 56, 57.

The direction of rotation of rotor 50 connected to shaft 17 depends upon which half of series field winding 53 is connected in the motor circuit. The mode of connection of the field winding 53 is selectively controlled either manually or automatically by relay 55, 56, 57, through a suitable control circuit arrangement, not shown. The relay system may well be that disclosed in the automatic radio direction indicator system of copending application, Serial No. 286,733 referred to above; that of the motor driving arrangements disclosed in copending application, Serial No. 323,106, also referred to; or other suitable one.

The clutch of Fig. 4 incorporates a modified or non-magnetic region. An annular groove 60 is made in drive disk 16 in place of the brass or copper ring of the previous forms. The multiple magnetic action of this clutch is similar to that previously described, and similar numerals refer to similar parts of the other figures. The function of the non-magnetic region is to interrupt the path of the magnetic flux in the clutch member so that the flux is constrained to cross the air gap into the other clutch member and then return to the first one around the non-magnetic region. The non-magnetic region may be of air such as groove 60 of Fig. 4; of metal such as brass or copper; or of other non-magnetic material. A metallic non-magnetic region is more advantageous in that in enhances the mechanical strength of the clutch member incorporating it.

The non-magnetic region need not be a continuous ring, so long as it effects its main purpose of interrupting the magnetic flux path in the clutch member and causes a multiple transversal of the flux between the respective coacting clutch members. The clutch members proper are made of material with a low reluctance to the flow of magnetic flux. The expression "magnetic material" is herein used to refer to a material of such nature, which, in commercial constructions is generally soft iron. Embodiments of the invention employing a plurality of magnetic regions or rings, such as the one illustrated in Fig. 3, may assume several forms. Thus, a larger number of rings may be used in the respective drive plates than shown in Fig. 3, correspondingly increasing the traversals of the magnetic flux between the clutching members. Also, the magnetic designs shown for the drive and driven members may well be reversed, and still carry out the principles of the invention. The clutching force between the magnetically coacting clutch members corresponds to the density of the magnetic flux and the number of interlinkages thereof between the members.

Although we have illustrated and described preferred embodiments and uses which the present invention may assume in practice, we are aware that other modifications and applications falling within the broader spirit and scope thereof are feasible, and accordingly do not intend to be limited except as set forth in the following claims.

What we claim is:

1. An electromagnetic clutch comprising a first member of magnetic material having a clutching surface, a second member of magnetic material having a clutching surface magnetically and frictionally coactable with the first member surface, a housing member of magnetic material surrounding said first member and extending close thereto to establish a relatively low reluctance magnetic air gap therewith, and magnetic flux generating means including a winding supported within said housing member for producing the magnetic flux for the clutch for establishing frictional engagement between said clutching surfaces.

2. An electromagnetic clutch comprising a first rotatable disk of magnetic material having a clutching surface, a second rotatable disk of magnetic material having a clutching surface magnetically and frictionally coactable with the first disk surface, a tubular member of magnetic material stationary with respect to and surrounding said disks, said first disk having a larger diameter than said second disk and extending close to the inner surface of said member to establish a relatively low reluctance magnetic air gap therewith, and magnetic flux generating means including a winding supported within said member for producing the magnetic flux for the clutch for establishing frictional engagement between said clutching surfaces.

3. An electromagnetic clutch comprising a first rotatable disk of magnetic material having a clutching surface containing a non-magnetic region, a second rotatable disk of magnetic material having a clutching surface coactable with the first disk surface across said region thereof, a tubular member of magnetic material stationary with respect to and surrounding said first disk, said first disk having a larger diameter than said second disk and extending close to the inner surface of said member to establish a relatively low reluctance magnetic air gap therewith, and magnetic flux generating means including a winding supported within said member for producing the magnetic flux for the clutch to pass between said disks and between said member and said first disk.

4. An electromagnetic clutch comprising a first member of magnetic material having a clutching surface containing a non-magnetic region, a hub of magnetic material extending from said first member for attachment to a shaft, a second member of magnetic material having a clutching surface magnetically and frictionally coactable with the first member surface across said region thereof, a housing of magnetic material surrounding said members, the surface of one member being larger than the surface of the other member and extending close to said housing to establish a relatively low reluctance magnetic air gap therewith, a winding core of magnetic material secured within said housing and closely spaced from the said hub to constitute a magnetic path of low reluctance between the housing and hub, and a winding arranged with said core for establishing the magnetic flux for the clutch for establishing frictional engagement between said clutching surfaces.

5. An electromagnetic clutch comprising a first rotatable disk of magnetic material having a clutching surface, an annular ring of non-magnetic material secured concentrically within said first disk and extending contiguously with the clutch surface thereof, a hub of magnetic material extending from said first disk for attachment to a shaft, a second rotatable disk of magnetic material having a clutching surface coactable with the first member surface across said ring thereof, a tubular member of magnetic material stationary with respect to and surrounding the peripheral edges of said disks, the diameter of one of said disks being larger than the diameter of the other disk and extending close to the inner surface of said member for establishing a relatively low reluctance magnetic air gap therewith, a winding core of magnetic material secured within said member and extending close to said hub to constitute a magnetic path of low reluctance between the member and hub, and a winding fitted with said core for establishing the magnetic flux for the clutch for establishing frictional engagement between said clutching surfaces.

6. An electromagnetic clutch comprising a first rotatable member of magnetic material having a flat clutching surface arranged normal to its axis of rotation and containing a non-magnetic region contiguous with said clutch surface, a hub of magnetic material extending from said first member along the axis direction for attachment to a shaft, a second rotatable member of magnetic material having a flat clutching surface coactable with the first member surface across said region thereof, a stationary tubular member of magnetic material stationary with respect to and surrounding said first member, the surface of said first member being larger than the surface of said second member and arranged to extend close to the inner surface of said tubular member for establishing a relatively low reluctance magnetic path therewith, a winding core of magnetic material secured to said tubular member, said core being magnetically related with said tubular member and extending close to said hub to constitute a magnetic path of low reluctance between the tubular member and hub, and a winding secured with said core and stationary tubular member for establishing the magnetic flux for the clutch which passes between said rotatable members and between said tubular member and first member.

7. An electromagnetic clutch comprising a first disk of magnetic material having a clutching surface arranged normal to its axis of rotation, a second disk of magnetic material having a clutching surface coactable with the first disk surface, a tubular member of magnetic material surrounding both said disks, the diameter of one of said disks being larger than the diameter of the other disk and extending close to the inner surface of said member for establishing a relatively low reluctance magnetic path therewith, a winding core of magnetic material magnetically related with said member and arranged to constitute a magnetic path of low reluctance between said member and said one disk, a winding arranged with said core for establishing the magnetic flux for the clutch across said disks and to said member through said one disk, said member containing openings opposite the coacting disk surfaces through which particles are eliminated centrifugally.

8. An electromagnetic clutch comprising a first member of magnetic material having a flat clutching surface, a non-magnetic annular region concentric within said member and contiguous with said clutching surface, a hub extending from said member along the axial direction, a second member of magnetic material mounted coaxially with said first member and having a flat clutching surface coactable with said first member surface across said annular region thereof whereby magnetic flux from the hub of said first member traverses the space between said members a plurality of times to effectively clutch said members together, a housing of magnetic material surrounding said first member and closely spaced from the peripheral edge thereof to establish a magnetic path therewith, a coil core of magnetic material secured to said housing, and a coil winding for establishing the magnetic flux for the clutch fitted in said core.

9. An electromagnetic clutch comprising a drive disk having a flat clutching surface arranged normal to its axis of rotation and including a circular ring of non-magnetic material concentric about the axis, a hub extending from said disk along the axial direction for attachment to a drive shaft, a driven disk mounted coaxially with said drive disk and having a flat clutching surface coactable with the drive disk surface whereby magnetic flux from the hub of said drive disk traverses the gap between said disk surfaces a plurality of times to effectively clutch said disks together, a tubular housing surrounding said drive disk and closely spaced from the peripheral edge thereof to establish a magnetic path therewith, said housing containing slots radially opposite the coacting region between said disk surfaces and through which particles are eliminated by centrifugal action.

10. An electromagnetic clutch comprising a drive disk having a flat clutching surface arranged normal to its axis of rotation and including a circular ring of non-magnetic material concentric about the axis, a hub extending from said disk along the axial direction for attachment to a drive shaft, a driven disk mounted coaxially with said drive disk and having a flat clutching surface coactable with the drive disk surface whereby magnetic flux from the hub of said drive disk traverses the gap between said disk surfaces a plurality of times to effectively clutch said disks together, a tubular housing surrounding said drive disk and closely spaced from the peripheral edge thereof to establish a magnetic path therewith, a tubular coil core magnetically related with said housing, a coil winding fitted in said core for establishing the magnetic flux for the clutch, a section of said core being concentric about said hub forming a narrow magnetic air gap therewith.

11. An electromagnetic clutch comprising a first face plate of magnetic material having a flat clutching surface arranged normal to its axis of rotation, a non-magnetic circular region concentric within said face plate and contiguous with said clutching surface, a hub extending from said face plate along the axial direction for attachment to a drive shaft, a second face plate of relatively low mass and low rotational inertia and made of magnetic material, said second face plate being mounted coaxially with said first face plate and having a flat clutching surface coactable with the first face plate surface across said circular region thereof whereby magnetic flux from the hub of said first face plate traverses the gap between said plate surfaces a plurality of times to effectively clutch said plates together, a tubular housing of magnetic material surrounding said first face plate and closely spaced from the peripheral edge thereof to establish a magnetic path therewith, said housing containing slots radially opposite the coacting space between said face plates and through which particles are eliminated by centrifugal action, a tubular coil core of magnetic material secured to said housing and magnetically related therewith, a coil winding fitted in said core for establishing the magnetic flux for the clutch, a tubular portion of said core being concentric about said hub with a relatively small spacing to constitute a magnetic air gap of low reluctance between the stationary core and rotatable hub.

12. An electromagnetic clutch comprising a first face plate of magnetic material having a flat clutching surface arranged normal to its axis of rotation, a non-magnetic circular region concentric within said face plate and contiguous with said clutching surface, a hub extending from said face plate along the axial direction for attachment to a drive shaft, a second face plate of relatively low mass and low rotational inertia and made of magnetic material, said second face plate being mounted coaxially with said first face plate and having a flat clutching surface coactable with the first face plate surface across said circular region thereof whereby magnetic flux from the hub of said first face plate traverses the gap between said plate surface a plurality of times to effectively clutch said plates together, a tubular member of magnetic material surrounding said first face plate and closely spaced from the peripheral edge thereof to establish a magnetic path therewith, a tubular coil core of magnetic material secured to said member and magnetically related therewith, a coil winding fitted in said core for establishing the magnetic flux for the clutch, a tubular portion of said core being concentric about said hub to constitute a magnetic air gap of low reluctance therebetween, and spring means normally mechanically biasing said face plates apart in the axial direction.

13. An electromagnetic clutch comprising a drive face plate of magnetic material having a flat clutching surface arranged normal to its axis of rotation, a non-magnetic circular region concentric within said face plate and contiguous with said clutching surface, a hub extending from said face plate along the axial direction for attachment to a drive shaft, a driven face plate of relatively low mass and low rotational inertia and made of magnetic material, said driven face plate being mounted coaxially with said drive face plate and having a flat clutching surface coactable with the drive face plate surface across said circular region thereof whereby magnetic flux from the hub of said drive face plate traverses the gap between said plate surfaces a plurality of times to effectively clutch said plates together, a tubular member of magnetic material surrounding said drive face plate and closely spaced from the peripheral edge thereof to establish a magnetic path therewith, a tubular coil core of magnetic material secured to said member and magnetically related therewith, a coil winding fitted in said core for establishing the magnetic flux for the clutch, a tubular portion of said core being concentric about said hub with a relatively small spacing to constitute a magnetic air gap of low reluctance between the stationary core and rotatable hub, a stationary brake shoe arranged adjacent a non-clutching section of said driven face plate, and a spring normally mechanically biasing said second face plate axially into engagement with said brake shoe to accelerate stopping of the low inertia driven face plate upon clutch deenergization.

14. An electromagnetic clutch comprising a first rotatable disk of magnetic material having a flat clutching surface arranged normal to its axis of rotation and containing a non-magnetic region, a hub of magnetic material extending from said first disk along the axis direction, a second rotatable disk of magnetic material mounted coaxially with said first disk and having a flat clutching surface coactable with the first disk surface across said region thereof, a tubular member of magnetic material stationary with respect to and surrounding said first disk, said first disk having a larger diameter than said second disk and extending close to said member for establishing a relatively low reluctance magnetic air gap therewith, a tubular coil core of magnetic material secured to said member and magnetically related therewith, said core being closely spaced from said hub to constitute a magnetic path of low reluctance between the member and hub, and magnetic flux generating means including a winding supported within said member and core for establishing the magnetic flux for the clutch across said disks and to said member through said first disk, said member containing slots radially opposite the coacting disk surfaces through which particles are eliminated centrifugally.

15. An electromagnetic clutch comprising a drive member of magnetic material having a plurality of spaced non-magnetic concentric annular regions, and a driven member of magnetic material mounted opposite said drive member and containing a non-magnetic annular region at a radial position intermediate each adjacent set of regions of said drive member, whereby magnetic flux from said drive member traverses the space between said members a plurality of times in correspondence with the number of non-magnetic annular regions to effectively clutch said members together.

16. An electromagnetic clutch comprising a first disk of magnetic material having a flat clutching surface arranged normal to its axis of rotation, a plurality of spaced non-magnetic circular rings concentric about said axis and contiguous with said clutching surface, and a second disk of magnetic material and of relatively low mass and low rotational inertia, said second disk being mounted coaxially with and opposite said first disk and having a flat clutching surface coactable with the first disk surface across said non-magnetic rings, said second disk containing a non-magnetic circular ring at a radial position intermediate each adjacent set of rings in said first disk, whereby magnetic flux traverses the gap between said disks a plurality of times in correspondence with the number of said rings to effectively clutch said disks together.

17. An electromagnetic clutch comprising a first disk of magnetic material having a clutching surface and containing a plurality of spaced non-magnetic regions contigous with said clutching surface, a second disk of magnetic material having a clutching surface coactable with the first disk and containing a non-magnetic region at a position intermediate each of the first disk regions whereby magnetic flux traverses between said disks a plurality of times in correspondence with the number of non-magnetic regions, a housing member of magnetic material surrounding said disks and spaced close to the peripheral edge of one of the disks to establish a direct magnetic path therewith, and magnetic flux generating means including a winding supported with said housing member for establishing the magnetic flux for the clutch across said disks and to said housing member through said one disk.

18. An electromagnetic clutch comprising a first rotatable disk of magnetic material having a flat clutching surface containing a plurality of spaced annular rings of non-magnetic material contiguous with said clutching surface, a hub of magnetic material extending from said disk along the axis direction, a second rotatable disk of magnetic material mounted coaxially with said first disk and having a flat clutching surface coactable with the first disk surface across said rings thereof, said second disk containing a non-magnetic annular ring at a radial position intermediate the first disk rings whereby magnetic flux traverses the gap between said disks a plurality of times in correspondence with the number of rings to effectively clutch said disks together, a tubular member of magnetic material stationary with respect to and surrounding said first disk and spaced close to the peripheral edge thereof to establish a low reluctance magnetic path therewith, a winding core of magnetic material secured within said member arranged close to said hub to constitute a magnetic path of low reluctance between the member and hub, and a winding fitted within said core to establish the magnetic flux for the clutch.

WILLIAM P. LEAR.
ARLING W. RYBERG.